(12) United States Patent
Mansour et al.

(10) Patent No.: US 9,932,914 B2
(45) Date of Patent: Apr. 3, 2018

(54) METHOD FOR INCREASING ELECTRIC OPERATION IN HYBRID ELECTRIC VEHICLES

(71) Applicant: FORD GLOBAL TECHNOLOGIES, LLC, Dearborn, MI (US)

(72) Inventors: Mohamad Mansour, Dearborn Heights, MI (US); Shunsuke Okubo, Belleville, MI (US); Carol Louise Okubo, Belleville, MI (US); Paul Stephen Bryan, Belleville, MI (US); Kenneth Frederick, Dearborn, MI (US); Floyd Cadwell, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 14/685,659

(22) Filed: Apr. 14, 2015

(65) Prior Publication Data

US 2016/0304086 A1    Oct. 20, 2016

(51) Int. Cl.
*B60W 10/06* (2006.01)
*F02D 31/00* (2006.01)
(Continued)

(52) U.S. Cl.
CPC .............. *F02D 31/00* (2013.01); *B60K 6/24* (2013.01); *B60K 6/48* (2013.01); *B60W 10/06* (2013.01); *B60W 20/10* (2013.01); *F02N 11/0818* (2013.01); *F02N 11/0862* (2013.01); *B60K 2006/4825* (2013.01); *B60W 20/00* (2013.01); *B60W 2510/06* (2013.01); *B60W 2510/244* (2013.01); *B60W 2520/10* (2013.01);
(Continued)

(58) Field of Classification Search
CPC ...... B60W 20/40; B60W 20/15; B60W 20/16; B60W 20/10; B60K 6/24; B60K 6/48; F02N 11/0814; F02N 11/0818; F02N 11/0833; F02N 2200/061; F02N 2200/06; F02N 2200/0801
See application file for complete search history.

(56) References Cited

U.S. PATENT DOCUMENTS 5,789,882 A    8/1998   Ibaraki et al.
6,624,527 B1   9/2003   Crombez et al.
(Continued)

FOREIGN PATENT DOCUMENTS

JP    2010234872 A    * 10/2010
JP    2010234873 A    * 10/2010
(Continued)

*Primary Examiner* — James A Shriver, II
*Assistant Examiner* — Steve Clemmons
(74) *Attorney, Agent, or Firm* — David B. Kelley; Brooks Kushman P.C.

(57) ABSTRACT

A hybrid electric vehicle includes an internal combustion engine configured to provide power to traction wheels, and a controller. The controller is configured to, in response to the engine being off and a power request exceeding an engine-start threshold, delay an engine start when vehicle speed is below a predetermined value. Delaying an engine start may include providing an engine-start-threshold offset. The offset decreases as vehicle speed increases. The engine is started when the power request exceeds a sum of the engine-start threshold and the engine-start-threshold offset.

13 Claims, 3 Drawing Sheets

(51) Int. Cl.
  *B60K 6/24*   (2007.10)
  *B60K 6/48*   (2007.10)
  *F02N 11/08*  (2006.01)
  *B60W 20/10*  (2016.01)
  *B60W 20/00*  (2016.01)

(52) U.S. Cl.
  CPC ..... *B60W 2540/10* (2013.01); *B60W 2710/06* (2013.01); *F02N 11/0814* (2013.01); *F02N 2200/061* (2013.01); *F02N 2200/0801* (2013.01); *F02N 2200/101* (2013.01); *F02N 2300/2011* (2013.01); *Y02T 10/48* (2013.01)

(56) References Cited

U.S. PATENT DOCUMENTS

| | | | | |
|---|---|---|---|---|
| 6,739,418 B2* | 5/2004 | Ogata | ............... | B60K 6/46 123/179.4 |
| 7,146,959 B2* | 12/2006 | Thompson | ......... | F02N 11/0803 123/179.4 |
| 7,237,634 B2 | 7/2007 | Severinsky et al. | | |
| 7,831,343 B2* | 11/2010 | Formanski | ......... | B60L 11/1881 180/65.28 |
| 7,853,391 B2* | 12/2010 | Komeda | ............... | B60W 40/10 340/463 |
| 8,177,006 B2* | 5/2012 | Leone | ............... | B60K 6/442 180/65.23 |
| 8,271,156 B2 | 9/2012 | Jinno et al. | | |
| 8,302,575 B2* | 11/2012 | Senda | ............... | F02N 11/0833 123/179.4 |
| 8,655,523 B2* | 2/2014 | Fukushiro | ............... | B60K 6/46 701/22 |
| 8,660,725 B2* | 2/2014 | Kawai | ............... | B60K 6/445 180/65.21 |
| 8,755,959 B2* | 6/2014 | Fassnacht | ............... | B60K 6/48 701/1 |
| 8,755,962 B2* | 6/2014 | Suzuki | ............... | B60K 6/48 180/65.265 |
| 9,067,588 B2* | 6/2015 | Endo | ............... | B60W 20/10 |
| 9,168,896 B2* | 10/2015 | Kim | ............... | B60R 99/00 |
| 9,421,967 B2* | 8/2016 | Ueno | ............... | B60K 6/48 |
| 9,422,908 B2* | 8/2016 | Matsunaga | ............... | F02D 41/00 |
| 9,499,040 B2* | 11/2016 | Roos | ............... | B60K 6/442 |
| 2009/0192660 A1* | 7/2009 | Tamor | ............... | B60L 15/2045 701/22 |
| 2010/0280687 A1* | 11/2010 | Tate, Jr. | ............... | B60W 10/06 701/22 |
| 2011/0166733 A1* | 7/2011 | Yu | ............... | B60K 6/445 701/22 |
| 2012/0116626 A1* | 5/2012 | Perkins | ............... | B60W 10/06 701/22 |
| 2013/0144514 A1* | 6/2013 | Choi | ............... | B60K 6/48 701/113 |
| 2013/0166125 A1* | 6/2013 | Yamamoto | ............... | B60L 7/14 701/22 |
| 2013/0274981 A1* | 10/2013 | Kraemer | ............... | B60W 10/06 701/22 |
| 2014/0100730 A1 | 4/2014 | Park et al. | | |

FOREIGN PATENT DOCUMENTS

| | | | | |
|---|---|---|---|---|
| JP | 2013035336 A | * | 2/2013 | |
| JP | 2013067337 A | * | 4/2013 | |
| JP | 2014189080 A | * | 10/2014 | |
| WO | WO 2013179753 A1 | * | 12/2013 | .......... F02N 11/0833 |

* cited by examiner

METHOD FOR INCREASING ELECTRIC OPERATION IN HYBRID ELECTRIC VEHICLES

TECHNICAL FIELD

This disclosure relates to systems and methods for controlling the operation of an engine in an internal combustion vehicle.

BACKGROUND

Hybrid electric vehicles generally include both an engine and at least one traction motor. One method of improving the fuel economy in an HEV is to shut down the engine during times that the engine operates inefficiently, or is not otherwise needed to propel the vehicle. In these situations, the traction motor is used in an electric-only drive mode to provide all of the power needed to propel the vehicle.

SUMMARY

A hybrid electric vehicle according to the present disclosure includes an internal combustion engine configured to provide power to traction wheels, and a controller. The controller is configured to, in response to the engine being off and a power request exceeding an engine-start threshold, delay an engine start when vehicle speed is below a predetermined value. Delaying an engine start may include providing an engine-start-threshold offset. The offset decreases as the vehicle speed increases. In such embodiments, the engine is started when the power request exceeds a sum of the engine-start threshold and the engine-start-threshold offset.

In one embodiment, the engine-start-threshold offset has a maximum value based on a battery-discharge limit. The engine-start-threshold offset may be based on vehicle speed and the engine-start threshold, and may be stored in and obtained from a lookup table.

In some embodiments, the controller is configured to delay the engine start in response to the engine being off, the power request exceeding the engine-start threshold, and a battery state of charge (SOC) exceeding an SOC threshold. In such embodiments, when the battery SOC is below the SOC threshold, the engine is started when the power request exceeds the engine-start threshold.

A method of controlling a hybrid electric vehicle according to the present disclosure, wherein the vehicle has an internal combustion engine, includes starting the engine in response to the engine being off, a first driver power request exceeding an engine-start threshold and current vehicle speed being above a predetermined value. The method further includes delaying an engine start event in response to the engine being off, a second driver power request exceeding the engine-start threshold and current vehicle speed being below the predetermined value.

A hybrid electric vehicle according to the present disclosure includes traction wheels, an electric machine configured to provide power to the traction wheels, an internal combustion engine configured to provide power to the traction wheels, and a controller. The controller is configured to coordinate the electric machine and internal combustion engine to satisfy a driver power request, wherein in response to a driver power request exceeding an engine-start threshold when the engine is off and the vehicle speed is below a predetermined value, the controller delays an engine start event.

Embodiments according to the present disclosure provide a number of advantages. For example, systems and methods according to the present disclosure may avoid unnecessary engine starts during launch events, thus improving customer perception of overall fuel economy. Furthermore, systems and methods according to the present disclosure may avoid engine restarts during brief temporary increases in driver power request ("pedal noise").

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
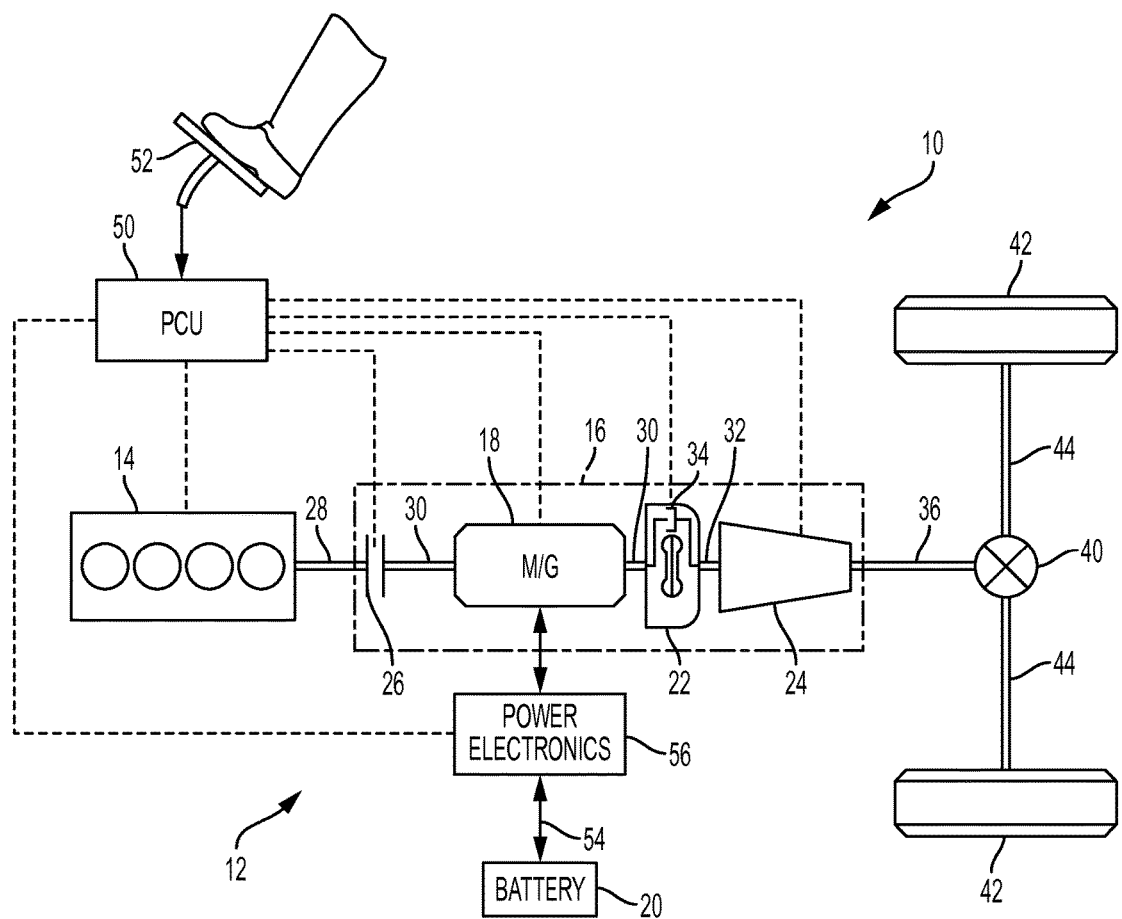
FIG. 1 is a schematic representation of a hybrid-electric vehicle according to the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Hybrid-electric vehicles may provide significant fuel economy advantages relative to conventional engine-powered vehicles due to reduced engine usage. Hybrid-electric vehicles are generally configured to operate in a plurality of modes, including at least one operating mode with the engine on and an electric-only mode (i.e. with the engine off). Hybrid-electric vehicles are usually configured to operate in the various operating modes according to an algorithm calibrated for maximum fuel efficiency.

However, some customers may perceive electric-only mode to be necessarily more efficient. Customer satisfaction may thus be generally increased by prolonged operation in electric-only mode. Consequently, it may be desirable to increase the duration and quantity of intervals of electric-only operation relative to the default (e.g. optimized for fuel efficiency) algorithm.

When decelerating to a full stop, known hybrid-control logic will frequently result in the engine being stopped. Subsequently, when accelerating from the full stop, known hybrid-control logic will start the engine when the driver power demand exceeds an engine-start threshold. Generally speaking, the engine-start threshold is based on current battery state of charge (SOC) and charging/discharging limits. Similarly, when driving at speed in electric-only mode, when the driver power demand exceeds an engine-start threshold the engine will be started.

In embodiments according to the present invention, a cushion or buffer is provided to enable continued electric-only operation when the driver power request exceeds the threshold. In a preferred embodiment, the buffer takes the form of an offset added to the engine-start threshold.

Figure 2:
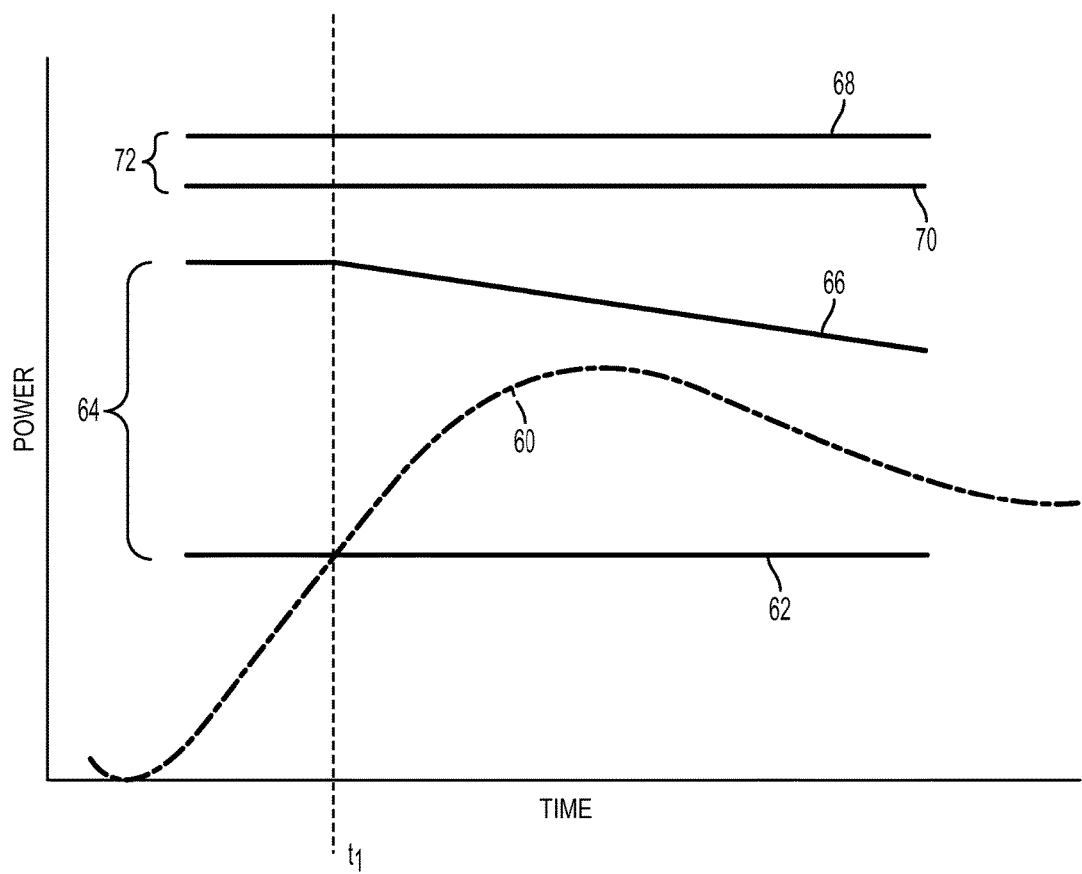
FIG. 2 illustrates an engine-start threshold and various engine-start-threshold offsets.

FIG. 2 illustrates an engine-start-threshold offset according to one embodiment of the present invention. A driver power request 60 varies over time, for example as the driver adjusts an accelerator pedal position. At time $t_1$, the driver power request 60 exceeds a base engine-start threshold 62. The base engine-start threshold may be based on battery state of charge, discharge limits, and/or other factors. Thus, according to the base hybrid logic, the engine would ordinarily be started at time $t_1$.

An engine-start-threshold offset 64 is provided and added to the base engine-start threshold 62 to generate a modified engine-start threshold 66. The engine-start-threshold offset 64 may be a function of vehicle speed. In a preferred embodiment, the engine-start-threshold offset 64 has a maximum value when the vehicle is stopped and decreases as vehicle speed increases. In a further preferred embodiment, the engine-start-threshold offset is configured to decay to zero over a predefined interval after the driver power request 60 exceeds the base engine-start threshold 62, as discussed in further detail below.

Because the driver power request 60 does not exceed the modified engine-start threshold 66, the engine is not started. The power request 60 is thus satisfied while maintaining vehicle operation in electric-only mode, enhancing the perception of efficient operation.

In a preferred embodiment, the maximum value of the engine-start-threshold offset 64 is limited based on a battery discharge limit 68. The battery discharge limit 68 corresponds to a maximum power deliverable by the high voltage battery at current operating conditions. The current operating conditions may include current battery state of charge, accessory power draw, and inherent system discharge limits.

In a further preferred embodiment, the engine-start-threshold offset is further limited to an adjusted discharge limit 70 based on a discharge limit buffer 72. While possible to limit the offset only on the discharge limit 68, it is desirable to provide a buffer 72 to ensure that sufficient battery discharge capacity is reserved to start the engine if necessary. The magnitude of the buffer 72 is thus preferably based on a power quantity required to start the engine.

Figure 3:
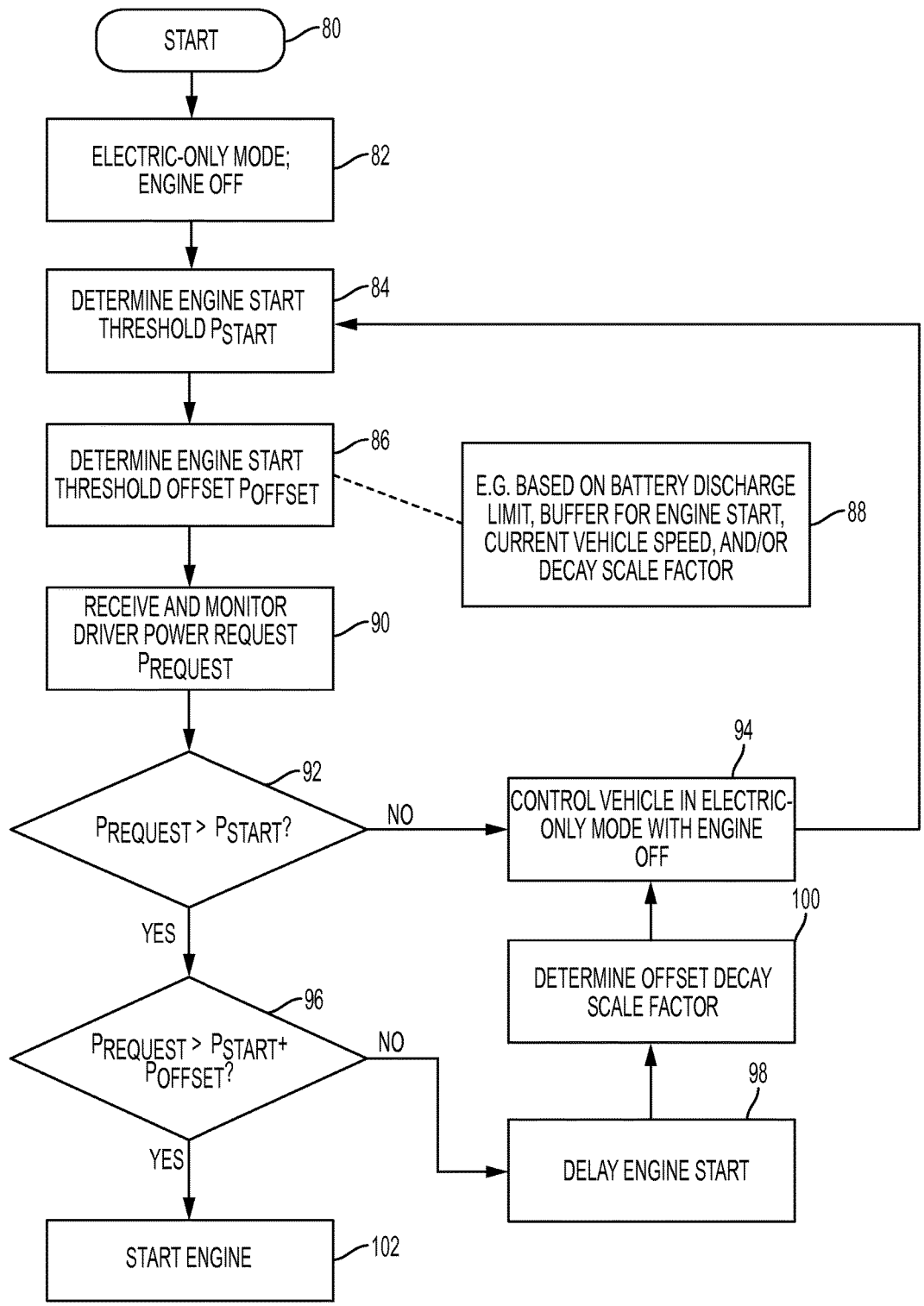
FIG. 3 illustrates a method of controlling a hybrid-electric vehicle in flowchart form.

Referring now to FIG. 3, a method of controlling a vehicle according to the present disclosure is illustrated in flowchart form. The method begins at block 80. The hybrid vehicle is travelling in electric-only mode, i.e. with the engine off, as illustrated at block 82. An engine-start threshold $P_{start}$ is determined and stored, as illustrated at block 84. The engine-start threshold $P_{start}$ is determined, for example, based on battery state of charge, discharge limits, and/or other factors.

An engine-start-threshold offset $P_{offset}$ is then determined and stored, as illustrated at block 86. The engine-start-threshold offset $P_{offset}$ may be based on factors including a battery discharge limit, a buffer to ensure power to start the engine, current vehicle speed, and/or a decay scale factor, as illustrated at block 88. The decay scale factor will be discussed in further detail below with respect to block 100.

A driver power request $P_{request}$ is received and monitored, as illustrated at block 90. The driver power request $P_{request}$ may be received, for example, by way of a driver actuation of an accelerator pedal. The power request $P_{request}$ may also be received based on outputs from a cruise control algorithm, self-driving vehicle algorithm, or other partially- or fully-automated driving systems.

A determination is then made of whether the driver power request $P_{request}$ exceeds the engine-start threshold $P_{start}$, as illustrated at operation 92. If no, then the vehicle is controlled in electric-only mode with the engine off, as illustrated at block 94. Control then returns to block 84. Thus, while the driver power request remains below the engine-start threshold, the vehicle continues in electric-only mode with the engine off. The engine-start threshold $P_{start}$ and the engine-start-threshold offset $P_{offset}$ are recalculated each cycle, as a change in current operating conditions may cause a change in at least one of the respective offsets.

If yes, then a determination is made of whether the driver power request $P_{request}$ exceeds a sum of the engine-start threshold $P_{start}$ and the engine-start-threshold offset $P_{offset}$, as illustrated at operation 96. If no, then the engine start is delayed, as illustrated at block 98. An offset-decay scale factor is determined, as illustrated at block 100. The offset-decay scale factor is provided to decay $P_{offset}$ to zero over a defined interval after a driver power request $P_{request}$ exceeds the engine-start threshold $P_{start}$. The offset-decay scale factor may be a function of time elapsed after the driver power request $P_{request}$ exceeds the engine-start threshold $P_{start}$, current vehicle speed, battery state of charge, and/or other appropriate variables. Operation then continues to block 94.

If yes, then the engine is started, as illustrated at block 102. The driver power request may then be satisfied at least in part using power from the internal combustion engine.

Variations on the above are, of course, possible. As an example, in some embodiments, a hybrid vehicle is provided with an "ECO" button. Various vehicle systems are configured to operate in a first mode in response to the ECO button being inactive and a second mode in response to the ECO button being active. In some such embodiments, the engine-start-threshold offset is provided only when the ECO button is active. In other such embodiments, the engine-start-threshold offset is provided only when the ECO button is inactive.

As may be seen from the above description, the present invention provides a method of controlling a hybrid vehicle that delays engine starts when permissible, thus avoiding engine restarts when the vehicle takes off from a dead stop or during brief temporary increases in driver power request.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid electric vehicle comprising:
   an internal combustion engine configured to provide power to traction wheels; and
   a controller configured to, in response to the engine being off and a power request exceeding an engine-start threshold, modify the engine-start threshold as a function of vehicle speed by providing an engine-start-threshold offset that decreases as vehicle speed increases, and starting the engine when the power request exceeds a sum of the threshold and the offset.

2. The vehicle of claim 1, wherein the engine-start-threshold offset has a maximum value based on a battery-discharge limit.

3. The vehicle of claim 1, wherein the engine-start-threshold offset is based on the vehicle speed and the engine-start threshold.

4. The vehicle of claim 3, wherein the engine-start-threshold offset is obtained from a lookup table.

5. The vehicle of claim 1, wherein the controller is configured to delay the engine start in response to the engine being off, the power request exceeding the engine-start threshold, and a battery state of charge (SOC) exceeding an SOC threshold.

6. A method of controlling a hybrid electric vehicle having an internal combustion engine, the method comprising:
in response to the engine being off, a first driver power request exceeding an engine-start threshold and current vehicle speed being above a predetermined value, starting the engine; and
modifying the engine-start threshold by a magnitude that is based on the vehicle speed; and
in response to the engine being off and a second driver power request exceeding the engine-start threshold but being less than the modified engine-start threshold, delaying an engine start event;
wherein delaying an engine start event comprises providing an engine-start-threshold offset, the offset decreasing as vehicle speed increases, and starting the engine when the power request exceeds a sum of the engine-start threshold and the engine-start-threshold offset.

7. The method of claim 6, wherein the engine-start-threshold offset has a maximum value based on a battery-discharge limit.

8. The method of claim 6, wherein the engine-start-threshold offset is based on the current vehicle speed and the engine-start threshold.

9. The method of claim 8, wherein the engine-start-threshold offset is obtained from a lookup table.

10. The method of claim 6, further comprising in response to the engine being off, a second driver power request exceeding the engine-start threshold, current vehicle speed being below the predetermined value, and a battery state of charge being below a calibratable threshold, starting the engine.

11. A hybrid electric vehicle comprising:
traction wheels;
an electric machine configured to provide power to the traction wheels;
an internal combustion engine; and
a controller configured to
coordinate the electric machine and internal combustion engine to satisfy a driver power request,
start the engine in response to a driver power request exceeding an engine-start threshold, and
modify the engine-start threshold to delay an engine start event as a function of vehicle speed, including providing an engine-start-threshold offset, the offset decreasing as vehicle speed increases, and starting the engine when the power request exceeds a sum of the engine-start threshold and the engine-start-threshold offset.

12. The hybrid electric vehicle of claim 11, wherein the engine-start-threshold offset has a maximum value based on a battery-discharge limit.

13. The hybrid electric vehicle of claim 11, wherein the engine-start-threshold offset is based on the vehicle speed and the engine-start threshold.

* * * * *